(12) United States Patent
Terry et al.

(10) Patent No.: US 7,376,879 B2
(45) Date of Patent: *May 20, 2008

(54) MAC ARCHITECTURE IN WIRELESS COMMUNICATION SYSTEMS SUPPORTING H-ARQ

(75) Inventors: Stephen E. Terry, Northport, NY (US); Nader Bolourchi, Larchmont, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 541 days.

This patent is subject to a terminal disclaimer.

(21) Appl. No.: 10/270,822

(22) Filed: Oct. 15, 2002

(65) Prior Publication Data

US 2003/0086391 A1 May 8, 2003

Related U.S. Application Data

(60) Provisional application No. 60/343,661, filed on Oct. 19, 2001.

(51) Int. Cl.
*H03M 13/00* (2006.01)
*H04L 1/18* (2006.01)

(52) U.S. Cl. .............. 714/751; 370/335; 370/342; 370/394; 370/441

(58) Field of Classification Search ........ 714/751; 370/394
See application file for complete search history.

(56) References Cited

U.S. PATENT DOCUMENTS

| | | | |
|---|---|---|---|
| 5,838,668 A | 11/1998 | Okada et al. | |
| 5,970,062 A | 10/1999 | Bauchot | |
| 6,236,656 B1 | 5/2001 | Westerberg et al. | |
| 6,463,096 B1 | 10/2002 | Raleigh et al. | |
| 6,567,388 B1* | 5/2003 | Tomcik et al. | 370/335 |
| 6,658,005 B2 | 12/2003 | Seidel et al. | |
| 6,901,063 B2* | 5/2005 | Vayanos et al. | 370/335 |

(Continued)

FOREIGN PATENT DOCUMENTS

EP 0948154 10/1999

(Continued)

OTHER PUBLICATIONS

3rd Generation Partnership Project; UTRA High Speed Downlink Packet Access (HSDPA); 3GPP TS 25.308 v5.0.0, Release 5, Sep. 2001.

(Continued)

*Primary Examiner*—Guy J. Lamarre
(74) *Attorney, Agent, or Firm*—Volpe and Koenig, P.C.

(57) ABSTRACT

A medium access control (MAC) architecture determines transmission latency and block error rate requirements for a plurality of data flows, each data flow having an associated priority and each data flow comprising a plurality of data blocks. The MAC architecture specifies a scheduling entity that determines when transmissions are serviced, and by which hybrid automatic repeat request (H-ARQ) entity. H-ARQ entities determine whether each prior block had been successfully transmitted and, if not, request retransmission of unsuccessfully transmitted data blocks. The scheduling of the data blocks takes into account whether or not the previously transmitted data blocks require retransmission. The MAC architecture allows the scheduling entity the ability to initiate new transmissions at any time and to reinitiate previously unsuccessful transmissions at any time.

28 Claims, 4 Drawing Sheets

U.S. PATENT DOCUMENTS

2003/0086391 A1  5/2003  Terry et al.
2005/0243831 A1* 11/2005 Zhang et al. ............... 370/394

FOREIGN PATENT DOCUMENTS

| EP | 1006689 | 6/2000 |
|---|---|---|
| EP | 1 033 849 | 9/2000 |
| EP | 1033849 | 9/2000 |
| JP | 63-226151 | 9/1988 |
| JP | 01-289341 | 11/1989 |
| JP | 06-077963 | 3/1994 |
| JP | 07-221789 | 8/1995 |
| JP | 10-117213 | 5/1998 |
| JP | 10-190738 | 7/1998 |
| JP | 11-032077 | 2/1999 |
| JP | 2001-235335 | 8/2001 |
| JP | 2001-258063 | 9/2001 |
| WO | 0024153 | 4/2000 |
| WO | 0052873 | 9/2000 |

OTHER PUBLICATIONS

3GPP, "Third Generation Partnership Project; Technical Specification Group Radio Access Network; MAC Protocol Specification (Release 4);" 3GPP TS 25.321 V4.1.0, (Jun. 2001).

3GPP, "Third Generation Partnership Project; Technical Specification Group Radio Access Network; MAC Protocol Specification (Release 5)" 3GPP TS 25.306 V5.2.0, (Sep. 2002).

3GPP, "Third Generation Partnership Project; Technical Specification Group Radio Access Network; MAC Protocol Specification (Release 4);" 3GPP TS 25.321 V4.6.0, (Sep. 2002).

3GPP, "Third Generation Partnership Project; Technical Specification Group Radio Access Network; UE Radio Access Capabilities (Release 4)," 3GPP TS 25.306 V4.1.0, (Jun. 2001).

3GPP, "Third Generation Partnership Project; Technical Specification Group Radio Access Network; UE Radio Access Capabilities (Release 4)," 3GPP TS 25.306 V4.5.0, (Jun. 2002).

3GPP, "Third Generation Partnership Project; Technical Specification Group Radio Access Network; UE Radio Access Capabilities (Release 5);" 3GPP TS 25.306 V5.2.0, (Sep. 2002).

3GPP, "Third Generation Partnership Project; Technical Specification Group Radio Access Network; MAC Protocol Specification (Release 1999);" 3GPP TS 25.321 V3.8.0, (Jun. 2001).

3GPP, "Third Generation Partnership Project; Technical Specification Group Radio Access Network; UE Radio Access Capabilities (Release 1999)," 3GPP TS 25.306 V5.0.0, (Jun. 2001).

3rd Generation Partnership Project; UTRA High Speed Downlink Packet Access (HSDPA); 3GPP TS 25.308 v5.0.0, Release 5, (Sep. 2001).

3rd Generation Partnership Project; Technical Specification Group Radio Access Network; High Speed Downlink Packet Access; Overall UTRAN Description (Release 5); 3GPP TR 25.855 V1.0.0 (Jun. 2001).

3rd Generation Partnership Project; Technical Specification Group Radio Access Network; High Speed Downlink Packet Access; Overall UTRAN Description (Release 5); 3GPP TR 25.855 V5.0.0 (Sep. 2001).

Borgonovo et al., "MAC for WATM Air Interface: Impact of Error Control Schemes on Protocol Design," *1999 IEEE 49th Vehicular Technology Conference*, pp. 2064-2069 (May 16, 1999).

Fratta et al., "PRAS: A MAC Protocol for Wireless ATM Networks," Global Telecommunications Conference · Globecom'99, XP010373448, vol. 5, pp. 2743-2751, (Dec. 5, 1999).

Gubbi, "Multimedia Streams and Quality of Service in the Next Generation Wireless Home Networks," *1999 IEEE International Workshop on Mobile Multimedia Communications, (MoMuC '99)*, pp.232-235, (Nov. 15, 1999).

Interdigital, "MAC-hs Scheduling, Prioritization and Flow Control Aspects," TSGR2#24(101)2303, TSG-RAN Working Group 2 Meeting #24, (Aug. 22-26, 2001).

* cited by examiner

MAC ARCHITECTURE IN WIRELESS COMMUNICATION SYSTEMS SUPPORTING H-ARQ

CROSS REFERENCE TO RELATED APPLICATIONS

The application claims priority from Provisional Patent Application No. 60/343,661, filed Oct. 19, 2001.

BACKGROUND

The present invention is related to MAC architecture in a wireless communication system where Hybrid Automatic Repeat Request (H-ARQ) techniques are applied.

A block diagram of the UMTS Terrestrial Radio Access Network (UTRAN) MAC-hs layer architecture is illustrated in FIG. 1, and a block diagram of the user equipment (UE) MAC hs architecture is shown in FIG. 2. The UTRAN MAC-hs 30 shown in FIG. 1 comprises a Transport Format Combination (TFC) selection entity 31, a scheduling device 32, a plurality of H-ARQ processors 33a, 33b and a flow controller 34.

The UE MAC-hs 40 comprises an H-ARQ processor 41. As will be explained in further detail herinafter, with reference to both FIGS. 1 and 2, the H-ARQ processors 33a, 33b in the UTRAN MAC-hs 30 and the H-ARQ processor 41 in the UE MAC-hs 40 work together to process blocks of data.

The H-ARQ processors 33a, 33b in the UTRAN MAC-hs 30 handle all of the tasks that are required for H-ARQ to generate transmissions and retransmissions for any transmission that is in error. The H-ARQ processor 41 in the UE MAC-hs 40 is responsible for generating acknowledgements (ACKs) to indicate a successful transmission and negative acknowledgements (NACKs) in the case of failed transmissions. The H-ARQ processors 33a, 33b and 41 process sequential data streams for each user data flow. Blocks of data received on each user data flow are sequentially assigned to H-ARQ processors 33a, 33b. Each H-ARQ processor 33a, 33b initiates a transmission, and in the case of an error, the H-ARQ processor 41 requests a retransmission. On subsequent transmissions, the modulation and coding rate may be changed in order to ensure a successful transmission. The H-ARQ processor 41 in the UE MAC-hs 40 may combine the soft information from the original transmission and any subsequent retransmissions. The data to be retransmitted and any new transmissions to the UE are forwarded to the scheduling device 32.

The scheduling device 32, coupled between the H-ARQ processors 33a, 33b and the TFC selector 31, functions as radio resource manager and determines transmission latency in order to support the required QoS. Based on the outputs of the H-ARQ processors 33a, 33b and the priority of new data being transmitted, the scheduling device 32 forwards the data to the TFC selection entity 31.

The TFC selection entity 31, coupled to the scheduling device 32, receives the data to be transmitted and selects an appropriate dynamic transport format for the data to be transmitted. With respect to H-ARQ transmissions and retransmissions, the TFC selection entity 31 determines modulation and coding.

Data streams are processed sequentially, and each data block is processed until successful transmission is achieved or the transmission fails and the data is discarded. Retransmissions signaled by the H-ARQ process take precedence over any new data to be transmitted. Each H-ARQ processor 33a, 33b performs transmissions and retransmissions until the data block transmission is determined successful or failed. Using this scheme, higher priority data transmissions may be delayed while lower priority data retransmissions are processed until success or failure is determined.

UE connections require support of several independent traffic control signaling channels. Each of these channels has QoS requirements, which include guaranteed and/or acceptable transmission latency levels. Since the H-ARQ processing is taken into account prior to scheduling, it is not possible for higher priority data to supercede lower priority data retransmissions. Therefore, the transmission latency QoS requirements for high priority data transmissions may not be achievable when low priority data transmissions have been previously assigned to H-ARQ processors 33a, 33b.

Since retransmissions are combined with previous transmissions in the H-ARQ process, it is possible that if the first transmissions are sufficiently corrupted, subsequent retransmissions will not achieve successful transmission. In this case since transmissions can not be reinitiated as new transmissions from the scheduling entity 32, data is discarded.

Accordingly, there exists a need for an improved MAC-hs architecture both in the UTRAN and UE that allows for higher priority transmissions to supercede lower priority transmissions and for the ability to reinitiate transmissions at any time.

SUMMARY

A medium access control (MAC) architecture that determines transmission latency and block error rate requirements for a plurality of data flows, each data flow having an associated priority and each data flow comprising a plurality of data blocks. The MAC architecture specifies a scheduling entity that determines when transmissions are serviced, and by which hybrid automatic repeat request (H-ARQ) entity. H-ARQ entities determine whether each prior block had been successfully transmitted and, if not, request retransmission of unsuccessfully transmitted data blocks. The scheduling of the data blocks takes into account whether or not the previously transmitted data blocks require retransmission. The MAC architecture allows the scheduling entity the ability to initiate new transmissions at any time and to reinitiate previously unsuccessful transmissions at any time.

BRIEF DESCRIPTION OF THE DRAWING(S)

DETAILED DESCRIPTION OF THE PREFERRED EMBODIMENT(S)

Figure 1:
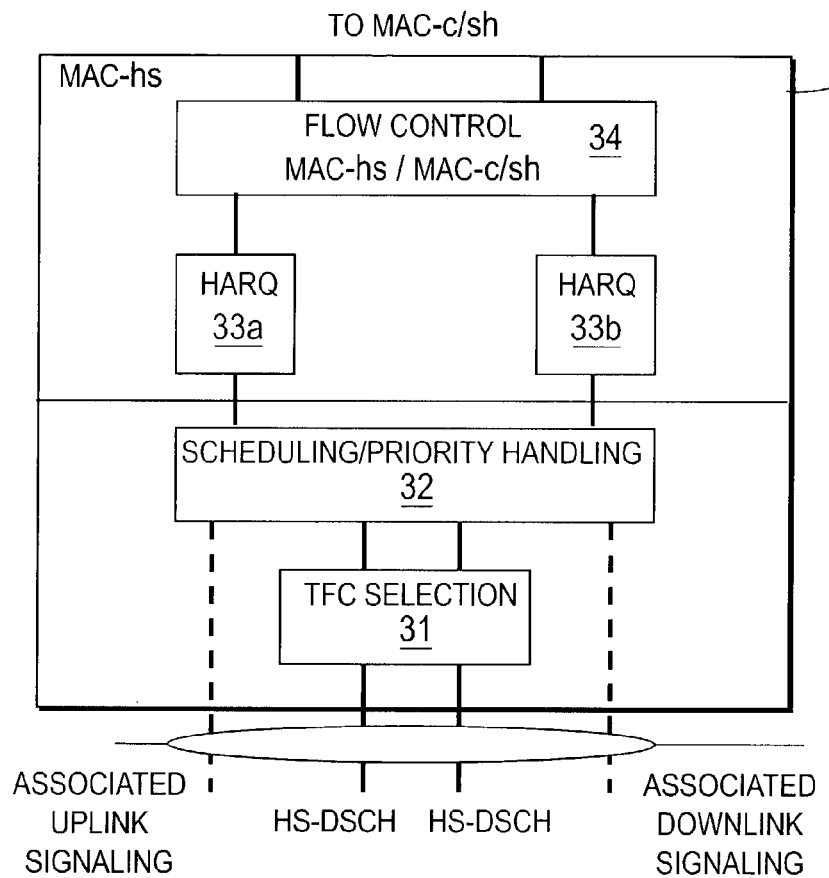
FIG. 1 is a prior art UTRAN MAC-hs.
Figure 2:
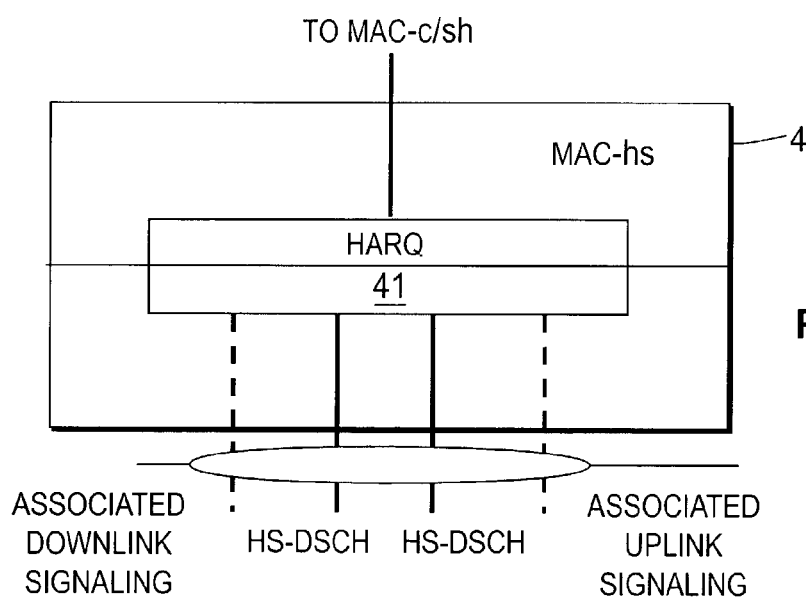
FIG. 2 is a prior art UE MAC-hs.

The preferred embodiments will be described with reference to the drawing figures where like numerals represent like elements throughout.

Figure 3:
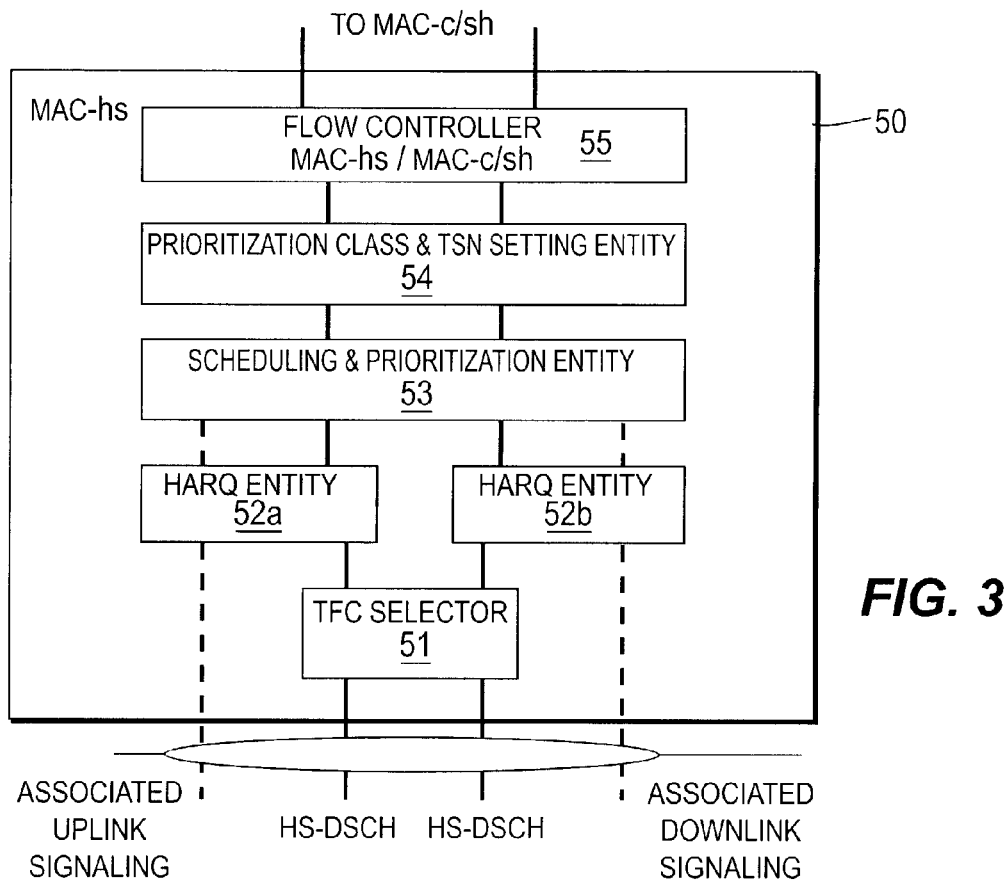
FIG. 3 is a block diagram of a UTRAN MAC-hs in accordance with the preferred embodiment of the present invention.

FIG. 3 is a block diagram of the UTRAN MAC-hs 50, preferably located at the Node B, in accordance with the preferred embodiment of the present invention. The UTRAN MAC-hs 50 comprises a TFC selector 51, a plurality of H-ARQ entities 52a, 52b, a scheduling and prioritization entity 53, a priority class and TSN setting entity 54 and a flow controller 55. As will be explained in detail, the components of the UTRAN MAC-hs 50 are coupled together in a novel manner, which facilitates proper scheduling prioritization for greater ability to achieve transmission latency requirements and the ability to reinitiate transmissions at any time to reduce transmission errors within the UTRAN MAC-hs 50 (shown in FIG. 3) and UE MAC-hs 60 (shown in FIG. 4).

Similar to the prior art flow controller 34 discussed hereinbefore, the flow controller 55 of the present invention shown in FIG. 3, and, coupled to the MAC-c/sh of the RNC (not shown) and the priority class and TSN setting entity 54, provides a controlled data flow between the Node B and the RNC, taking the transmission capabilities of the air interface into account in a dynamic manner. Although shown in FIG. 3 as separate components, the functionality of the scheduling and prioritization handling entity 53 (hereinafter, the "scheduling entity 53") and the priority class and TSN setting entity 54 (hereinafter, the "TSN setting entity 54") may be combined into a single entity.

TSN setting entity 54 is coupled between the flow controller 55 and the scheduling entity 53. The TSN setting entity 54 of the present invention sets, for each priority class, a queue identifier and TSN for each new data block being serviced to ensure sequence in delivery of data blocks to higher layers. The TSN is unique to each priority class and queue identity within a high speed downlink shared channel (HS-DSCH), and is incremented for each new data block. Once a queue identifier and the TSN have been set for a new data block, the data block is forwarded to the scheduling entity 53.

The scheduling entity 53 processes data received from the TSN setting entity 54. The scheduling entity 53 functions as a radio resource manager for the cell, as well as maintaining QoS requirements for the users serviced by the UTRAN MAC-hs 50. The TSN and priority class identifiers for the data blocks to be transmitted are forwarded to the scheduling entity 53.

In accordance with the present invention, the scheduling entity 53 ensures proper prioritization of transmissions according to data flow QoS latency requirements and allows for reinitiation of failed H-ARQ transmissions that permits the greater ability to achieve QoS Block Error Rate (BLER) requirements. These abilities of the scheduling entity 53 are not possible when H-ARQ processing precedes the scheduling function as in the prior art system of FIG. 1. The scheduling entity 53 manages HS-DSCH physical resources between the H-ARQ entities 52a, 52b and data flows according to their QoS requirements for transmission latency and transport channel BLER requirements. Beside the QoS parameters, the scheduling algorithm used by the scheduling entity 53 may also operate according to, for example, various radio control resource parameters such as the signal-to-interference ratio (SIR), available and rate, speed of the UE, current load of the cell and other factors that are well known to those of skill in the art. The scheduling entity 53 determines the data (associated with a particular UE), and the H-ARQ entities 52a, 52b that will service the transmission.

The transmission assigned to the H-ARQ, 52a, 52b is either a new transmission, or a retransmission of data that previously was not successfully delivered. Status reports from the previous transmission signaled between the UE H-ARQ entity 61 (shown in FIG. 4) and the UTRAN H-ARQ entities 52a, 52b (shown in FIG. 3) are relayed to the scheduling entity 53 where it is determined whether a new or retransmission will be serviced. The UTRAN MAC-hs 50 architecture defined by the present invention allows the scheduling entity 53, at any time, to determine whether or not to permit new transmissions to be initiated on an H-ARQ entity 52a, 52b. New transmissions may be higher priority transmissions that need to supercede lower priority transmissions to achieve QoS transmission latency requirements, or reinitiation of previously failed or interrupted transmissions to achieve QoS transport channel BLER requirements.

The algorithm within the scheduling entity 53 schedules data transmissions according to priority class. The UTRAN MAC-hs 50 of the present invention allows lower priority transmissions to be interrupted for the transmission of higher priority transmissions, and provides the ability to reinitiate previously failed or interrupted transmissions at any time.

The scheduling entity 53 forwards radio resource scheduling information to the H-ARQs entities 52a, 52b. The scheduling entity 53 directs the H-ARQ entities 52a, 52b to initiate either a new transmission or a retransmission of a previous unsuccessful transmission by the particular H-ARQ entity 52a, 52b. The data is then forwarded to the TFC selector 51 for transmission. The TFC selector 51, coupled to the H-ARQ processors 52a, 52b, receives the transmissions and selects an appropriate dynamic transport format parameter for the data to be transmitted to the UE. Although shown in FIG. 3 as separate components, the functionality of the H-ARQ entities 52a, 52b and the TFC selector 51 may be combined into a single entity.

Figure 4:
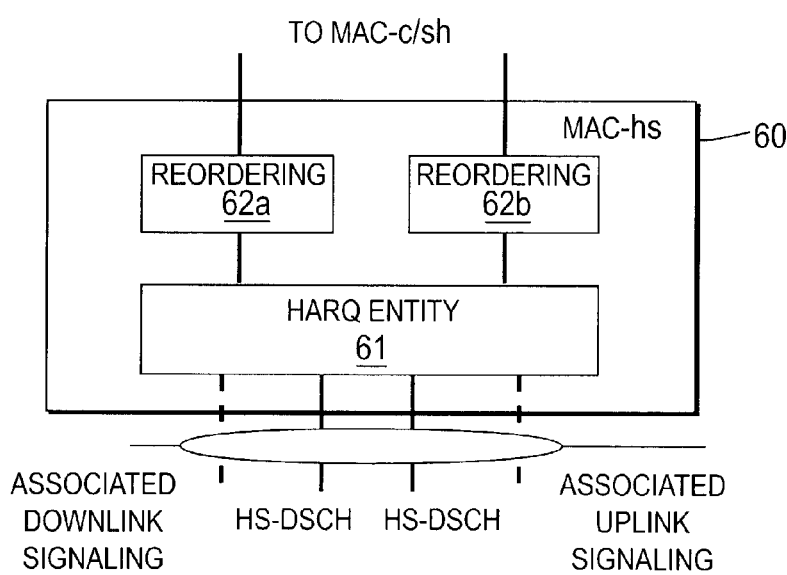
FIG. 4 is a block diagram of a UE MAC-hs in accordance with the preferred embodiment of the present invention.

A block diagram of a UE MAC-hs layer 60 for a UE in accordance with the preferred embodiment of the present invention is illustrated in FIG. 4. The UE MAC-hs 60 comprises a plurality of reordering devices 62a, 62b and an H-ARQ entity 61. Similar to the H-ARQ processor 41 described hereinbefore with respect to the UTRAN, the UE H-ARQ entity 61 is responsible for handling all the processes for implementing the H-ARQ protocol. Within the UE, the receiving H-ARQ entity 61 combines the soft information from the original transmission and any subsequent retransmissions.

Within the H-ARQ protocol layer, individual transmission priority classes and the required sequence of delivery (TSNs) are not known. Accordingly, successful reception, transmissions are reordered according to their TSN by the reordering devices 62a, 62b. The reordering devices 62a, 62b immediately forward for processing in higher layers transmissions following in sequence reception.

The MAC-hs process in accordance with the preferred embodiment of the present invention ensures that higher priority transmissions are not delayed by processing of lower priority transmissions. Additionally, transmissions can be reinitiated at any time, thereby reducing the transmission failure rate within the MAC-hs process. This gives the scheduling entity 53 the ability to utilize the input information available to determine the best combination of transmissions to achieve maximum performance of the system, maximum use of the radio network and maintain QoS requirements for transmission latency and BLER.

Although the elements or processes of the present invention have been described as discrete hardware components, for example the scheduling entity 53 and the TSN setting entity 54, these elements will most likely be implemented in one or more software routines or modules. It should be understood that the overall flow and sequence of information between each process is important, not whether the process is implemented separately or together, or in hardware or software.

Figure 5:
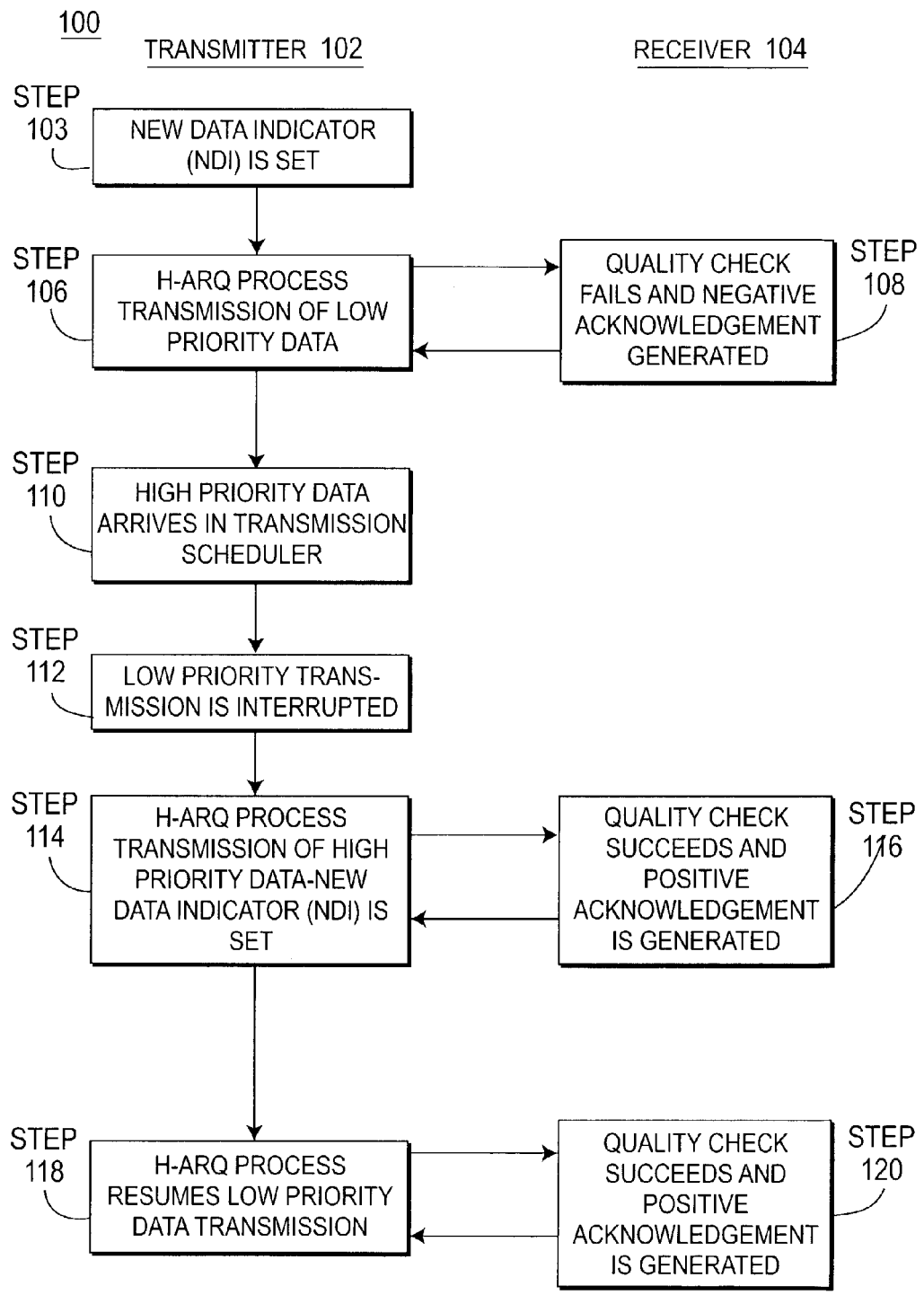
FIG. 5 is a flow diagram of a procedure for permitting higher priority transmissions to interrupt lower priority transmissions to achieve transmission seven zero latency requirements.

Referring to FIG. 5, a method 100 for permitting transmission of higher priority data to interrupt the transmission of lower priority data to achieve transmission latency requirements is shown. The method 100 is for communications between a transmitter 102 (such as at the UTRAN) and a receiver 104 (such as at the UE). The method 100 assumes communication for a particular H-ARQ process, such as between one of the H-ARQ entities 52a, 52b in the UTRAN and the corresponding H-ARQ entity 61 in the UE.

The method 100 commences with the setting of a new data indicator (NDI) for the establishment of a new H-ARQ process (step 103). The lower priority data is processed (step 106) at the transmitter 102. As aforementioned at the receiver 104, a quality check is performed whereby an acknowledgement (ACK) is generated if the transmission is successful (i.e. received without errors) or a non-acknowledgment (NACK) is generated if the transmission is not successful (step 108). The ACK or NACK is sent to the transmitter 102. Steps 106 and 108 are repeated until the transmission is successfully received at the receiver 104, or higher-priority data arrives at the scheduling entity (step 110) that needs to be scheduled to meet QoS transmission latency requirements.

If higher priority data needs to be scheduled for transmission to meet transmission latency requirements (step 110), lower priority data transmission may be interrupted (step 112). The H-ARQ process of transmission of the higher priority data is then commenced (step 114). Interruption of the previous data transmission is identified to the receiver 104 by setting of the NDI. At the receiver 104, a quality check is performed whereby an acknowledgement (ACK) is generated if the transmission is successful or a non-acknowledgment (NACK) is generated if the transmission is not successful (step 116). The ACK or NACK is then sent to the transmitter 102. Steps 114 and 116 are repeated until the higher priority data transmission is successfully received at the receiver 104.

Once the transmission of the higher priority data has been confirmed, the lower priority data transmission may then be reinitiated (step 118). The transmission is repeated until the quality check results in an ACK being generated by the receiver 104 (step 120). As with the aforementioned H-ARQ process, it may be necessary to retransmit the lower priority data by the transmitter 102 in response to an NACK generated by the receiver 104.

The method 100 of FIG. 5 is an example of scheduling of an H-ARQ process to achieve desired latency requirements for the data to be transmitted. With the proposed UTRAN MAC architecture 50 in accordance with the present invention, method 100 and other sequences of operation between the transmitter 102 and receiver 104 are also possible to achieve transmission latency requirements.

Figure 6:
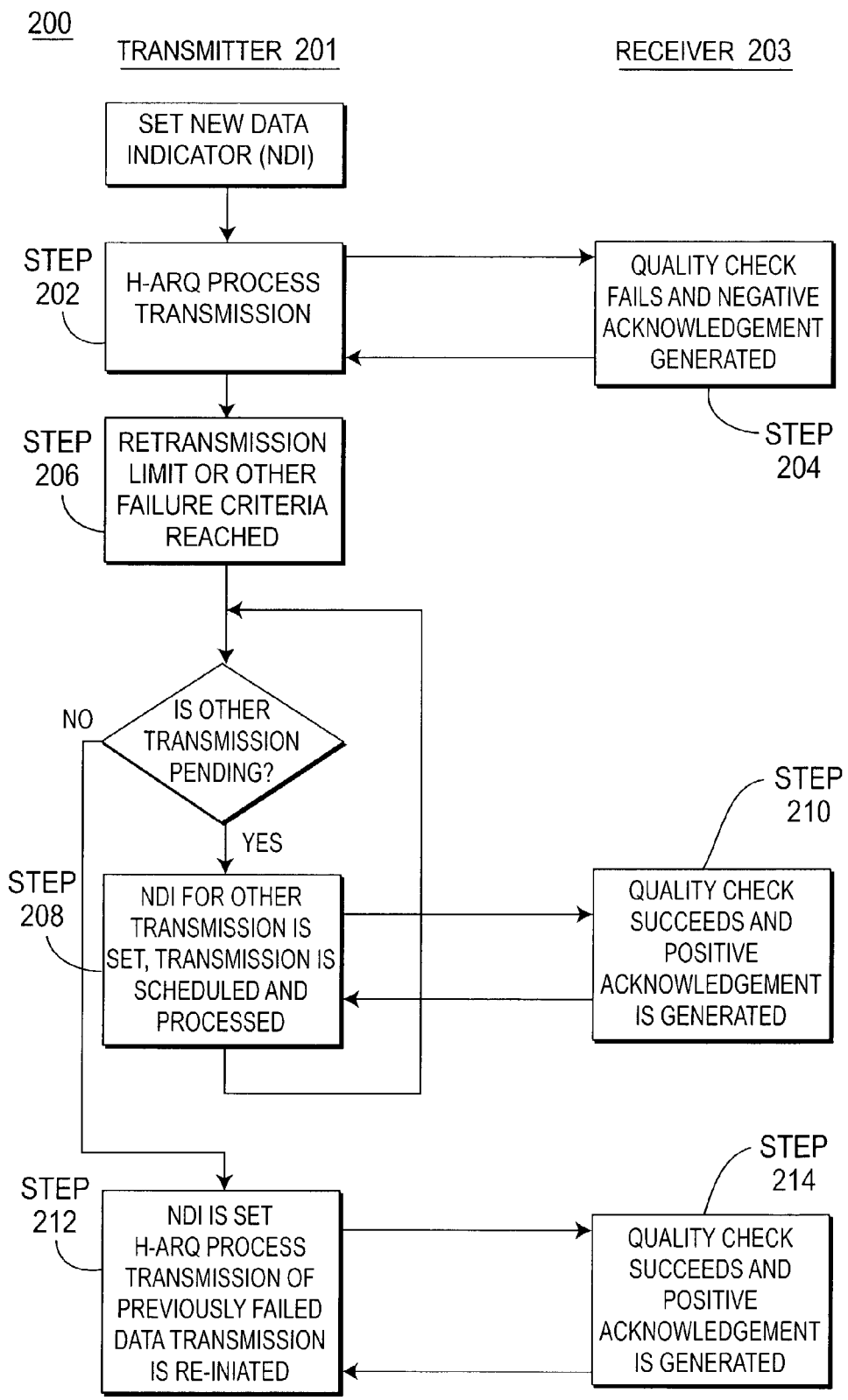
FIG. 6 is a flow diagram of a procedure to re-initiate failed transmissions to achieve Block Error Rate requirements.

Referring to FIG. 6, a method 200 for permitting re-initiation of failed transmissions to achieve Block Error Rate (BLER) requirements is shown. The method 200 is for communications between a transmitter 201 (such as at the UTRAN) and a receiver 203 (such as at the UE). The method 200 assumes communication for any set of H-ARQ processes associated with a UE, such as between one of the H-ARQ entities 52a, 52b in the UTRAN and the corresponding H-ARQ entity 61 in the UE.

The method 200 commences with the processing of data for transmission (step 202) at the transmitter 201. The H-ARQ processing for the data is performed, whereby a quality check is at the receiver 203 is performed (step 204) and an ACK or NACK is then sent to the transmitter 201. Steps 202 and 204 are repeated until the data transmission is successfully received at the receiver 203 or until a retransmission limit or another failure criteria is reached (step 206).

In the event that a failure criterion has been reached (step 206), the UTRAN MAC architecture 50 allows for re-initiation of the failed transmission on the H-ARQ process (steps 212 and 214). Re-initiation may be performed after the scheduling of other pending transmissions (steps 208, 210) or may proceed directly (steps 212, 214). Accordingly, it is possible subsequent to the transmission or failure of one or more "other" transmissions. These other transmissions may be scheduled (step 208) and transmitted by the transmitter 201 and the quality check is performed and ACKs or NACKs are generated and transmitted by the receiver 203 as appropriate (step 210).

Once the other transmissions have been successfully sent, or the failure criteria has been reached (steps 208-210), the previously failed transmission may be scheduled for transmission on the H-ARQ process (step 212). Re-initiation of the previous data transmission is identified to the receiver 203 by setting of the NDI. Retransmissions of the data are sent and an ACK or a NACK is generated as appropriate (step 214). Steps 212 and 214 are repeated until the transmission is successfully received at the receiver 203, or the retransmission limit or other failure criteria has been reached (step 206). The reinitiation of a previously failed transmission can be applied several times to any particular transmission in order to achieve BLER requirements.

While the present invention has been described in terms of the preferred embodiment, other variations which are within the scope of the invention as outlined in the claims below will be apparent to those skilled in the art.

What is claimed is:

1. A user equipment comprising:
   a hybrid automatic repeat request (H-ARQ) entity configured to generate a negative acknowledgement (NACK) after a first high speed medium access control (MAC-hs) data block including first information is transmitted to the user equipment over a wideband code division multiple access (WCDMA) high speed downlink shared channel (HSDSCH), the H-ARQ entity also being configured to receive and process a second MAC-hs data block instead of a third MAC-hs data block, the second MAC-hs data block including second information, the first information being retransmitted to the user equipment in the third MAC-hs data block after the second MAC-hs data block has been transmitted to the user equipment, the second and third MAC-hs data blocks having respective priority class identifiers indicating a higher transmission priority for the second MAC-hs data block than the third-MAC-hs data block; and
   at least one reordering entity configured to reorder a plurality of MAC-hs data blocks received by the HARQ entity, the plurality of MAC-hs data blocks including the second MAC-hs data block, said at least one reordering entity being configured to forward the plurality of MAC-hs data blocks for processing by protocol layers higher than a protocol layer associated with said at least one reordering entity, each of the plurality of MAC-hs data blocks having a corresponding one of a plurality of transmission sequence numbers (TSNs), the H-ARQ entity transmitting an acknowledgement (ACK) in response to each of the plurality of MAC-hs data blocks, the plurality of MAC-hs data blocks being transmitted to the user equipment on the WCDMA HS-DSCH.

2. The user equipment of claim 1, wherein the at least one reordering entity reorders the plurality of MAC-hs data blocks based on each of the plurality of TSNs.

3. The user equipment of claim 2, wherein the plurality of MAC-hs data blocks is a first plurality of MAC-hs data blocks, the H-ARQ entity is configured such that reception of the third MAC-hs data block is interrupted when a higher priority MAC-hs data block having a higher priority class identifier than the priority class identifier of the third MAC-hs data block required to be received by the H-ARQ entity.

4. The user equipment of claim 3, wherein the H-ARQ entity is configured to receive a new data indicator (NDI), which indicates the interruption of the reception of the third MAC-hs data block.

5. The user equipment of claim 1, wherein the plurality of MAC-hs data blocks is a first plurality of MAC-hs data blocks, the H-ARQ entity being configured to soft combine a second plurality of MAC-hs data blocks and a third plurality of MAC-hs data blocks, the second plurality of MAC-hs data blocks being MAC-hs data blocks which were transmitted to the user equipment and have NACKs associated therewith, and each of the third plurality of MAC-hs data blocks is retransmitted to the user equipment and received by the HARQ entity.

6. The user equipment of claim 5, wherein each of the first plurality of MAC-hs data blocks has an associated queue identity and priority.

7. The user equipment of claim 1, wherein each of the plurality of MAC-hs data blocks has an associated queue identity and priority.

8. The user equipment of claim 1, wherein the plurality of MAC-hs data blocks is a first plurality of MAC-hs data blocks, the H-ARQ entity is configured so that reception of the third MAC-hs data block is interrupted when a higher priority MAC-hs data block has a priority class identifier indicating a higher transmission priority than the priority class identifier of the third MAC-hs data block required to be received by the H-ARQ entity.

9. The user equipment of claim 8, wherein the H-ARQ entity is configured to receive a new data indicator (NDI), which indicates the interruption of the reception of the third MAC-hs data block.

10. The user equipment of claim 1, wherein the plurality of MAC-hs data blocks is a first plurality of MAC-hs data blocks, the H-ARQ entity is configured such that a sequence of a received second plurality of MAC hs data blocks is interrupted for reception of a third plurality of MAC-hs data blocks, each of the third plurality of MAC-hs data blocks having a higher priority class than each of the second plurality of MAC-hs data blocks.

11. The user equipment of claim 10, wherein the user equipment is configured to receive a new data indicator to indicate the interruption of the sequence of the received second plurality of MAC-hs data blocks.

12. The user equipment of claim 10, wherein the user equipment is configured to resume reception of the second plurality of MAC-hs data blocks in said sequence.

13. The user equipment of claim 10, wherein the resumed reception is in response to receipt of a new data indicator.

14. The user equipment of claim 1 wherein each of the plurality of MAC-hs data blocks has a corresponding one of a plurality of priority class and a corresponding one of a plurality of queue identifiers, each of the plurality of MAC-hs data blocks being assigned a respective one of the TSNs based on the plurality of priority class and the plurality of queue identifiers.

15. A method for use by a wideband code division multiple access (W-CDMA) user equipment (UE), the method comprising:
generating a negative acknowledgement (NACK) after a first high speed medium access control (MAC-hs) data block carrying first information has been transmitted to the UE;
receiving a second MAC-hs data block over a W-CDMA high speed downlink shared channel (HS-DSCH) instead of a third MAC-hs data block, the second MAC-hs data block including second information, the first information being retransmitted to the UE in the third MAC-hs data block after the second MAC-hs data block has been transmitted to the UE, the second and third MAC-hs data blocks having respective priority class identifiers indicating a higher transmission priority for the second MAC-hs data block than the third-MAC-hs data block;
sending an acknowledgement (ACK) in response to each of a plurality of received MAC-hs data blocks, the plurality of received MAC-hs data blocks including the received second MAC-hs data block, wherein each of the plurality of received data blocks has a transmission sequence number (TSN);
reordering the plurality of MAC-hs data blocks; and
forwarding the plurality of received MAC-hs data blocks for processing by protocol layers, which are higher than a layer associated with said reordering.

16. The method of claim 15, wherein the reordering is based on the TSNs.

17. The method of claim 16, wherein each of the plurality of MAC-hs data blocks has an associated queue identity and priority.

18. The method of claim 16, wherein the plurality of MAC-hs data blocks is a first plurality of MAC-hs data blocks, the method further comprising interrupting reception of the third MAC-hs data block when a higher priority MAC-hs data block having a higher priority class identifier than the priority class identifier required to be received by the H-ARQ entity.

19. The method of claim 18, further comprising receiving a new data indicator (NDI), which indicates the interruption of the reception of the third MAC-hs data block.

20. The method of claim 15, wherein the plurality of MAC-hs data blocks is a first plurality of MAC-hs data blocks, the method further comprising soft combining a second plurality of MAC-hs data blocks and a third plurality of MAC-hs data blocks, the second plurality of MAC-hs data blocks being MAC-hs data blocks which were transmitted to the user equipment and have NACKs associated therewith, and each of the third plurality of MAC-hs data blocks is retransmitted to the user equipment and received by the HARQ entity.

21. The method of claim 15, wherein each of the plurality of MAC-hs data blocks has an associated queue identity and priority.

22. The method of claim 15, wherein the plurality of MAC-hs data blocks is a first plurality of MAC-hs data blocks, the method further comprising interrupting reception of the third MAC-hs data block when a higher priority MAC-hs data block having a higher priority class identifier than the priority class identifier of the third MAC-hs data block required to be received by the H-ARQ entity.

23. The method of claim 15, further comprising receiving a new data indicator (NDI), which indicates the interruption of the reception of the third MAC-hs data block.

24. The method of claim 15, wherein the plurality of MAC-hs data blocks is a first plurality of MAC-hs data blocks, the method further comprising interrupting a sequence of a received second plurality of MAC hs data blocks for reception of a third plurality of MAC-hs data blocks, each of the third plurality of MAC-hs data blocks having a higher priority class identifier than each of the second plurality of MAC-hs data blocks.

25. The method of claim 24, further comprising receiving a new data indicator to indicate the interruption of the sequence of the received second plurality of MAC-hs data blocks.

26. The method of claim 24, further comprising resuming reception of the second plurality of MAC-hs data blocks in said sequence.

27. The method of claim 24, further comprising resuming reception of the second plurality of MAC-hs data blocks in said sequence in response to receipt of a new data indicator.

28. The method of claim 15, wherein each of the plurality of MAC-hs data blocks has a corresponding one of a plurality of priority class identifiers and a corresponding one of a plurality of queue identifiers, the method further comprising assigning each of the plurality of MAC-hs data blocks a respective one of the TSNs based on the plurality of priority class identifiers and the plurality of queue identifiers.

* * * * *

UNITED STATES PATENT AND TRADEMARK OFFICE
CERTIFICATE OF CORRECTION

PATENT NO. : 7,376,879 B2  Page 1 of 1
APPLICATION NO. : 10/270822
DATED : May 20, 2008
INVENTOR(S) : Terry et al.

It is certified that error appears in the above-identified patent and that said Letters Patent is hereby corrected as shown below:

ON THE TITLE PAGE

At section (56), OTHER PUBLICATIONS, page 2, left column, line 6, after "3GPP TS", delete "25.306" and insert therefor --25.321--.

At section (56), OTHER PUBLICATIONS, page 2, right column, line 9, after "25.306", delete "V5.0.0" and insert therefor --V3.2.0--.

At column 1, line 19, before the word "architecture", delete "MAC hs", and insert therefor --MAC-hs--.

At column 6, line 16, before the words "other transmissions", delete ". These", and insert therefor --these--.

At claim 10, column 7, line 51, after the words "plurality of", delete "MAC hs" and insert therefor --MAC-hs--.

At claim 24, column 9, line 7, after the words "plurality of", delete "MAC hs" and insert therefor --MAC-hs--.

Signed and Sealed this

Eighth Day of September, 2009

David J. Kappos
*Director of the United States Patent and Trademark Office*